United States Patent Office 3,011,973
Patented Dec. 5, 1961

3,011,973
IMPROVING THE STABILITY OF HYDRO-
CARBON DISTILLATES
Walter C. Bradbury, Union, and Frederick G. Hess, Cranbury, N.J., assignors to Cities Service Research and Development Company, New York, N.Y., a corporation of New Jersey
No Drawing. Filed Apr. 29, 1960, Ser. No. 25,516
9 Claims. (Cl. 208—297)

This invention relates to the catalytic treatment of hydrocarbons and more particularly relates to a novel process for improving the stability of hydrocarbon distillate.

Hyhrocarbon distillate fuels treated in accordance with the present invention include generally fuels having boiling ranges between about 100 and about 1200° F. and may include gasolene, kerosene, diesel fuels, heating fuels, jet fuels and the like. Such distillates may be obtained from any suitable source such as by fractionation of crude oils or may be obtained from any of the various hydrocarbon conversion or refining processes commonly used in the treatment of hydrocarbon oils. Such processes include, for instance, catalytic or thermal cracking or reforming, coking, alkylation, polymerization and the like. The process of the present invention is especially applicable to kerosenes and to fuel mixtures containing substantial portions of kerosene. Fuels containing substantial amounts of kerosene include, for instance, jet fuels which frequently contain from 30 to 60 volume percent or more of kerosene and frequently have boiling ranges between about 100 and about 600° F. The invention is also applicable to fuel compositions containing substantial amounts, such as at least about 30 volume percent, of hydrocarbon distillates of the type described above.

Distillates such as those described above have a strong tendency to form gums and sediments, especially after prolonged periods of storage or exposure to high temperatures. Such gums and sediments are highly undesirable and may clog fuel lines, valves, meters, filters, etc., as well as form deposits in internal combustion engines or fuel burners. In order to prevent the formation of such sediment and gums for as long a period as possible, various additives or inhibitors are commonly added to distillate fuels. While the use of such additives has proved effective in substantially increasing the stability of distillate fuels by preventing the formation of sediment or gums for substantial periods of time, such additives are expensive and are not always as effective as might be desired.

It is an object of the present invention to provide a method of treating hydrocarbon distillate fuels to improve the stability thereof.

It is another object of the invention to provide a novel process for improving the stability of hydrocarbon distillate fuels without the use of additives.

In accordance with a preferred embodiment of the present invention, hydrocarbon distillate fuel is treated for improvement of stability by contacting the same in the liquid phase under anhydrous conditions and at a temperature of at least about 400° F. with a supported aluminum sulfate catalyst.

The aluminum sulfate catalyst with which hydrocarbon distillate is treated in accordance with the invention is preferably supported on suitable supporting material such as neutral clay or silica gel in order to increase the effective surface area of the catalyst available for treatment of the hydrocarbon distillate. The solid aluminum sulfate catalyst may be present on the neutral clay or other support in any suitable quantities such as between about 1 and about 10 weight percent based on aluminum sulfate. In order to assist in distributing the aluminum sulfate over as large a surface area as possible, it is preferred that the supporting material be finely divided with material capable of passing through a 10 mesh or smaller screen being preferred. Material of 10–50 mesh size is especially suitable. A suitable catalyst may be prepared by mixing a solution of aluminum sulfate with neutral clay and then drying the product to eliminate water therefrom.

Treatment of hydrocarbon distillate in accordance with the present invention should be carried out in a substantially anhydrous atmosphere in order to prevent catalyst from becoming dissolved in water and being dissociated into free ions. The treatment may be carried out under any suitable conditions of temperature and pressure so long as the distillate being treated remains in the liquid phase. Temperatures should be maintained above about 400° F., preferably between about 450° and 600° F., while pressure should be sufficient to maintain the distillate being treated in the liquid phase. With temperatures between about 450° and about 600° F. pressures of between about 5 and about 200 p.s.i. have been found adequate although higher pressures may, of course, be used.

The mechanism by which stability of hydrocarbon distillate fuels is increased by the treatment of the present invention is not completely understood, but it is believed that such improved stability is a result of the removal of undesirable sulfur compounds as well as other undesirable compounds, such as certain oxygen and nitrogen compounds, by the catalytic action of the aluminum sulfate catalyst.

In treating distillate fuels in accordance with the present invention it is preferred to follow the catalytic treatment of the invention with a caustic or clay neutralizing treatment in accordance with conventional refining practice. If desired, the distillate fuel treated in accordance with the invention may also have been sweetened for removal of obnoxious sulfur compounds by conventional processes such as with a doctor solution or with an alkaline hypochlorite such as sodium hypochlorite. It is also contemplated that sweetening of the distillate may take place following the catalytic treatment of the present invention.

The following specific examples will illustrate the application and benefits of the present invention in the treatment of hydrocarbon distillates.

EXAMPLE 1

In order to evaluate the treatment of the present invention a suitable catalyst was prepared by mixing 150 grams of 14–20 mesh neutral clay with a solution of 12.3 grams $Al_2(SO_4)_3 \cdot 18H_2O$ in 150 milliliters of water. After drying in an oven at 300° F., the resulting aluminum sulfate catalyst was heated in a muffle furnace at 930° F. for 2 hours. 13.5 grams of this catalyst was then used to treat kerosene having the following properties prior to treatment.

ASTM distillation:
| | | |
|---|---|---|
| IBP | °F | 322 |
| 10% evap | °F | 366 |
| 20 | °F | 389 |
| 30 | °F | 398 |
| 40 | °F | 407 |
| 50 | °F | 419 |
| 60 | °F | 427 |
| 70 | °F | 438 |
| 80 | °F | 450 |
| 90 | °F | 469 |
| Max | °F | 501 |
| Recovered | percent | 97 |
| Residue | do | 2 |
| Loss | do | 1 |
| Gravity | °API | 44.2 |
| Freezing point | °F | −50.4 |
| Gums: | | |
| Existent | percent | 2.0 |
| Potential | do | 2.8 |
| Sulfur | wt. percent | 0.07 |
| FIA analysis: | | |
| Aromatic | do | 14.0 |
| Olefin | do | 0.3 |
| Saturates | do | 85.7 |
| Naphthalenes | do | 2.38 |
| Smoke point (min.) | | 25 |

For this run, the catalyst was placed in a fixed bed reactor measuring ½ inch in diameter by 18 inches long and the kerosene was passed through the reactor at the rate of 20.4 milliliters per minute for a total time of slightly more than 18 hours. The reactor inlet temperature was maintained between about 525° and about 530° F. while the outlet temperature varied between about 500° and about 550° F. During the run the pressure in the reactor rose from an initial pressure of 50 p.s.i.g. to a final pressure of 100 p.s.i.g. due to gradual plugging of the reactor preheater.

Following treatment with the aluminum sulfate catalyst, the kerosene was doctor sweetened and treated with 1 lb. per barrel of fine clay in a conventional manner. The finished product was then tested for stability by means of the standard CFR coker test. In this test the thermal stability of a distillate fuel is measured by heating the fuel to 400° F. while passing the fuel through a conduit surrounding a coaxial inner tube. The color of the inner tube following the test is then compared with a standard color chart to determine the deposit rating. A deposit rating of 0 signifies a clear color and correspondingly high stability fuel while increasing deposit ratings up to 4 signify increasing discoloration of the tube and correspondingly lower stability of the fuel tested. During the CFR coker test the distillate being tested is passed through a standard filter at a temperature of 500° F. and the pressure drop across the filter is measured and considered as another measure of thermal stability with relatively higher pressure drops indicating increased deposits of gums and sediments and, therefore, lower stability. The results of the CFR coker test on the kerosene treated with aluminum sulfate catalyst as described immediately above are shown in Table I below as the results of run No. 1.

EXAMPLE 2

In order to further evaluate the effectiveness of the present invention in improving thermal stability of distillate fuels two additional runs, designated as runs 2a and 2b, were made with the kerosene described above in Example 1 under substantially the same operating conditions as set forth in Example 1 and using fresh portions of the catalyst described in Example 1. These runs differed from run No. 1 reported in Example 1 only in that run 1 was a continuous run while runs 2a and 2b were intermittent runs which were carried out for approximately 8 hours at a time until the total time of about 18 hours had elapsed. The products of these runs were treated and tested as described above in Example 1 and the results are reported in Table I below.

EXAMPLE 3

In order to provide a comparison as to the effectiveness of the treatment described above, a control sample of the same kerosene used in the runs described above but which had not been treated with aluminum sulfate catalyst as described above was doctor sweetened, clay treated and subjected to the CFR coker test as described above with the results shown in Table I below.

Table I.—Results of CFR coker tests for thermal stability

| Run No. | Yield (bbls. per lb. catalyst) | CFR Coker Test Results | | |
|---|---|---|---|---|
| | | Pressure drop (in. Hg) | Deposit rating | time (min.) |
| Control | | 25.0 | 3 | 108 |
| 1 | 10.4 | 0 | 0 | 300 |
| 2a | 10.1 | 0.15 | 0 | 300 |
| 2b | 6.1 | 0 | 0 | 300 |

From Table I it is clear that the treatment of the present invention is extremely effective in increasing the stability of hydrocarbon distillate fuels. It will be noted that the control sample of kerosene which was not treated with aluminum sulfate catalyst produced a pressure difference of 25.0 inches of mercury and a deposit rating of 3 during a CFR coker test of only 108 minutes while the samples of kerosene which were treated in accordance with the invention as described above resulted in deposit ratings of 0 and substantially no pressure drop across the filter during CFR coker tests of 300 minutes duration.

In addition to the CFR coker test described above, the treated kerosene samples were subjected to specification tests in order to determine their suitability for use as commercial fuels. These tests showed the following results as compared with standard military specifications for jet fuel.

Table II.—Specification tests

| Run No. | 1 | 2a | 2b | Specification MIL-J-56240 |
|---|---|---|---|---|
| Sample No | H-52 | H-47 | H-48 | |
| Gums Existent | 0 | 1.0 | 2.0 | 7.0 max. |
| Gums Potential | 1.6 | 1.0 | 3.0 | 14.0 max. |
| Sulfur | 0.02 | 0.04 | 0.04 | 0.4 max. |
| FIA: | | | | |
| Aromatics | 14.9 | 11.0 | 11.9 | 25.0 max. |
| Olefins | 1.4 | 4.5 | 2.2 | 5.0 max. |
| Saturates | 83.7 | 84.5 | 85.9 | |
| Smoke Point | 25 | 23 | 23 | 19 min. |
| Naphthalenes, Vol. Percent | 2.4 | 2.22 | 2.24 | 3.0 max.[1] |
| Vis Cs @ −30° F | 10.31 | 9.39 | 9.90 | 16.5 max. |
| Luminometer No | | 53.0 | 56.1 | |
| Freezing Point, °F | | −52 | −54 | |

[1] Commercial airlines specification.

These results make it clear not only that the thermal stability of the treated fuel is substantially increased by treatment in accordance with the present invention, but also that such treatment produces distillate fuel having very superior characteristics for commercial use. Furthermore, such treatment appears to be more economical than conventional acid treatment in improving the stability of hydrocarbon distillates.

While the present invention has been described above with respect to certain preferred embodiments thereof, it will be understood by those skilled in the art that various changes and modifications may be made without departing from the spirit and scope of the invention and it is intended that all such changes and modifications be covered by the appended claims.

We claim:

1. The process for improving the stability of hydrocarbon distillate fuel which comprises contacting the same in the liquid phase in an anhydrous atmosphere with a supported aluminum sulfate catalyst.

2. The process for improving the thermal stability of hydrocarbon distillate fuel which comprises contacting the same in the liquid phase in an anhydrous atmosphere at a temperature of at least about 400° F. with a supported aluminum sulfate catalyst.

3. The process for improving the stability of hydrocarbon distillate fuel which comprises contacting the same in the liquid phase in an anhydrous atmosphere at a temperature between about 450° and about 600° F. with an aluminum sulfate catalyst supported on an inert carrier.

4. The process for improving the thermal stability of a hydrocarbon base fuel comprising at least about 30 volume percent kerosene which comprises contacting the same in the liquid phase in an anhydrous atmosphere with an aluminum sulfate catalyst supported on an inert carrier.

5. The process for improving the stability of hydrocarbon distillate fuel which comprises contacting the same in the liquid phase in an anhydrous atmosphere at a temperature of at least about 400° F. with a catalyst comprising between about 1 and about 10 weight percent aluminum sulfate deposited on an inert carrier.

6. The process for improving the stability of a hydrocarbon base fuel comprising at least about 30 volume percent kerosene which comprises contacting the same in the liquid phase in an anhydrous atmosphere at a temperature between about 450° and about 600° F. and at a pressure between about 5 and about 200 p.s.i.g. with a catalyst comprising between about 1 and about 10 weight percent aluminum sulfate deposited on a neutral clay support.

7. The process for improving the thermal stability of kerosense which comprises contacting the same in the liquid phase in an anhydrous atmosphere with an aluminum sulfate catalyst supported on an inert carrier.

8. The process for improving the stability of kerosense which comprises contacting the same in the liquid phase in an anhydrous atmosphere at a temperature between about 450° and about 600° F. and at a pressure between about 5 and about 200 p.s.i.g. with a catalyst comprising between about 1 and about 10 weight percent aluminum sulfate deposited on a neutral clay support.

9. The process for improving the stability of hydrocarbon distillate fuel which comprises contacting the same in the liquid phase in an anhydrous atmosphere at a temperature between about 450° and about 600° F. with a catalyst comprising between about 1 and about 10 wt. percent aluminum sulfate supported on an inert carrier.

References Cited in the file of this patent

UNITED STATES PATENTS

| | | |
|---|---|---|
| 1,826,145 | Lackman | Oct. 6, 1931 |
| 2,104,791 | Craig | Jan. 11, 1938 |
| 2,646,390 | Arnold et al. | July 21, 1953 |
| 2,666,021 | Milson | Jan. 12, 1954 |
| 2,872,413 | Elliott et al. | Feb. 3, 1959 |